United States Patent [19]
Hyuck

[11] Patent Number: 5,438,248
[45] Date of Patent: Aug. 1, 1995

[54] METHOD AND APPARATUS FOR RECOGNIZING DIFFERENT TYPES OF BATTERIES

[75] Inventor: Lee J. Hyuck, Seoul, Rep. of Korea

[73] Assignee: Goldstar Telecommunication Co., Ltd., Seoul, Rep. of Korea

[21] Appl. No.: 63,673

[22] Filed: May 19, 1993

[30] Foreign Application Priority Data

May 20, 1992 [KR] Rep. of Korea ............... 1992-8480

[51] Int. Cl.⁶ ................................................ H02J 7/00
[52] U.S. Cl. ............................................ 320/15; 320/2
[58] Field of Search ............................. 320/2, 13, 15

[56] References Cited
U.S. PATENT DOCUMENTS

4,577,145  3/1986  Mullersman ..................... 320/2
4,628,243 12/1986  Hodgman et al. .................. 320/2
5,184,059  2/1993  Patino et al. ..................... 320/15
5,200,686  4/1993  Lee .................................. 320/2
5,237,257  8/1993  Johnson et al. ................... 320/2

Primary Examiner—Kristine L. Kincaid
Attorney, Agent, or Firm—Finnegan, Henderson, Farabow, Garrett & Dunner

[57] ABSTRACT

A method for recognizing different types of batteries in a product capable of using two or more types of batteries so as to employ the battery life efficiently. The method includes detecting the battery voltage upon connection to a load and detecting variations of the battery voltage with load variations. The discharge voltages of an alkaline battery and a nickel-cadmimum are distinguished so as to avoid premature replacement of an alkaline battery.

27 Claims, 4 Drawing Sheets

METHOD AND APPARATUS FOR RECOGNIZING DIFFERENT TYPES OF BATTERIES

BACKGROUND OF THE INVENTION

1. Field of the Invention

The present invention relates generally to a method and apparatus for recognizing different types of batteries, and more particularly to a method and apparatus for recognizing different types of batteries to efficiently employ the available power in a battery.

2. Description of Related Art

Batteries are typically used to supply power to portable products such as radios, radiophones, stereo cassette tape players, etc. A Ni—Cd battery is a type of battery that is rechargeable and that has a discharge voltage that drops rapidly at a certain point. An alkaline battery is a type of battery that is not rechargeable but has a discharge voltage that drops gradually to the end of its useful life.

Figure 1:
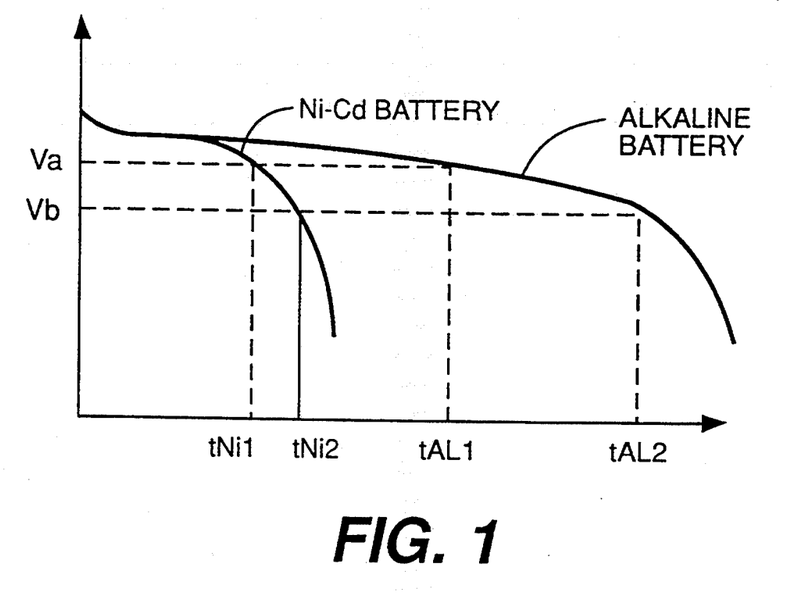
FIG. 1 is a graph illustrating discharge characteristics of an alkaline battery and of a Ni—Cd battery.

FIG. 1 is a graph showing discharge characteristics of the Ni—Cd battery and the alkaline battery, and showing monitored voltages Va and Vb. In FIG. 1, the available voltage of battery is referred to as Va. In some products, when the battery voltage drops under the available voltage Va, a microprocessor generates an alarm signal, through a buzzer, LCD etc., indicating that the battery should be charged or exchanged.

In FIG. 1, a cut-off voltage for shutting the system down is referred to as Vb. When the battery voltage drops under the cut-off voltage Vb, a microprocessor shuts down system operation.

In FIG. 1, the time to reach the Va of Ni—Cd is referred to as tNi1 and the time to reach the Vb as tNi2. When using Ni—Cd battery, because the time between tNi1 and tNi2 is relatively short, the battery should be promptly recharged or exchanged to prevent the battery voltage from falling below the cut-off voltage Vb.

If a battery such as an alkaline battery were to be used with monitored voltages set for a Ni—Cd battery, the use time of the alkaline battery may be unduly restricted. More specifically, the time to reach the available voltage Va of the alkaline battery is referred to as tAL1 and the time to reach the cut-off voltage Vb as tAL2. Since the discharge characteristics of the alkaline battery is long and linear, the time between tAL1 and tAL2 is several times as long as the time between tNi1 and tNi2 of a Ni—Cd battery, as shown in FIG. 1. Thus, when an alkaline battery is removed in accordance with an alarm signal generated based on Ni—Cd battery monitored voltages, there may be available power in the alkaline battery that is not used.

Therefore, in products using the two types of batteries, for example, a Ni—Cd battery or an alkaline battery, there is a problem that the available power of the alkaline battery is not sufficiently used. Alternatively, if monitored voltages are set to accommodate an alkaline battery, there is a possibility that erroneous operations of the electrical circuits can occur when using the Ni—Cd battery.

SUMMARY OF THE INVENTION

An object of the present invention is to provide an improved technique for recognizing types of batteries by detecting current discharge voltages of a battery.

Another object of the present invention is to provide a method and apparatus for recognizing different types of batteries by detecting an electrical characteristic of a battery.

Still another object of the present invention is to set a monitored voltage for an alkaline battery to be different from a monitored voltage for an Ni—Cd battery by the above method for recognizing types of batteries.

In accordance with an aspect of the present invention, in an apparatus adapted to receive a battery, a method of using the battery comprises the steps, performed by the apparatus, of: a first detecting step of detecting an electrical characteristic of the battery; determining a condition for terminating use of the battery in accordance with the electrical characteristic; and a second detecting step of detecting when the condition for terminating use of the battery is satisfied.

In accordance with another aspect of the present invention, a method for recognizing a type of battery comprises the steps of detecting a first voltage across a first load; detecting a second voltage across a load higher than the first load; calculating a first value in accordance with the first and second voltages; comparing the first value with a second value; and determining the type of battery in accordance with the result of the comparing step.

In accordance with another aspect of the present invention, a device for recognizing different types of batteries comprises means for receiving a battery; means for detecting voltages of the batteries under a first load or a second load higher than the first load; means for storing the detected voltages; means for processing the stored voltages to produce processed values; means for comparing the processed values with a predetermined value; and means for controlling the monitored voltage of the batteries in accordance with the result of the comparing step.

The accompanying drawings, which are incorporated in and which constitute a part of this specification, illustrate one embodiment of the invention and, together with the description, explain the principles of the invention.

DETAILED DESCRIPTION OF PREFERRED EMBODIMENT

Figure 2:
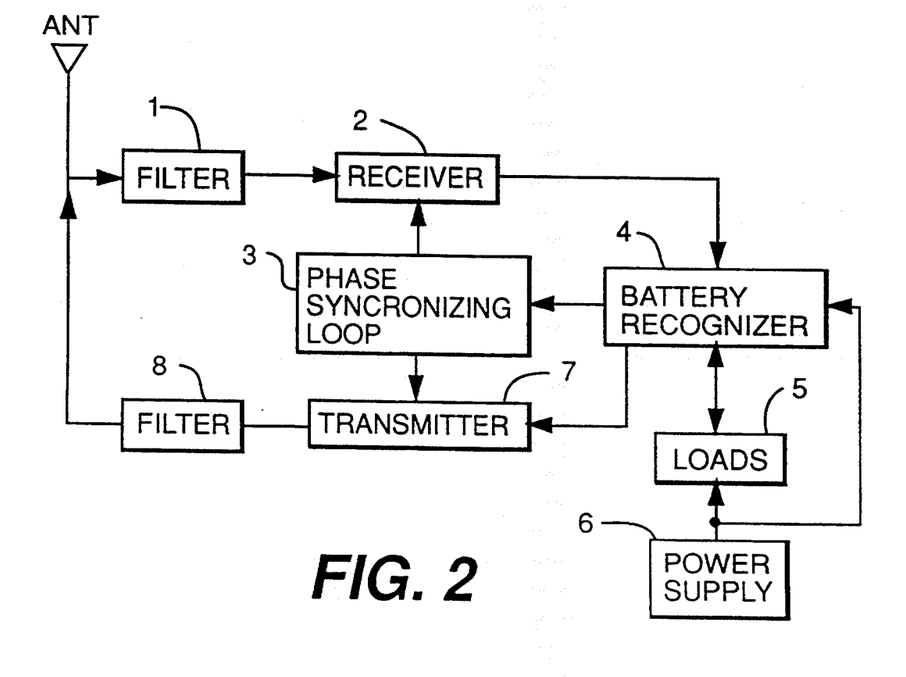
FIG. 2 is a schematic diagram of a portable radiophone that recognizes different types of batteries according to an embodiment of the present invention.

FIG. 2 is a schematic diagram of a portable radiophone according to an embodiment of the present invention. A filter 1 passes a desired bandwidth of high-frequency signals from an antenna ANT. A receiver 2 amplifies the high-frequency signals from filter 1. This amplified signal is mixed with a local oscillation frequency. From this mixed signal, a middle-frequency is detected and demodulated to the original signal.

A phase synchronizing loop 3 generates the frequency corresponding to transmitting/receiving frequency in response to the control signal of battery recognizer 4. A transmitter 7 modulates the transmitting signal of battery recognizer 4 to the high-frequency signal from phase synchronizing loop 3 and amplifies the modulated high-frequency signal. A transmitting filter 8 filters the amplified high-frequency signal from transmitter 7 and transmits the filter signal to the antenna ANT.

A power supply 6 supplies the power of a battery to the system of the portable radiophone via resisters R1 and R2 (FIG. 3) for dividing the battery voltage. The battery recognizer 4 detects the battery voltage from power supply 6, processes audio signals and various data demodulated from the receiver 2, and controls the operation of the portable radiophone. Loads 5 output the audio signal from the battery recognizer 5.

Figure 3:
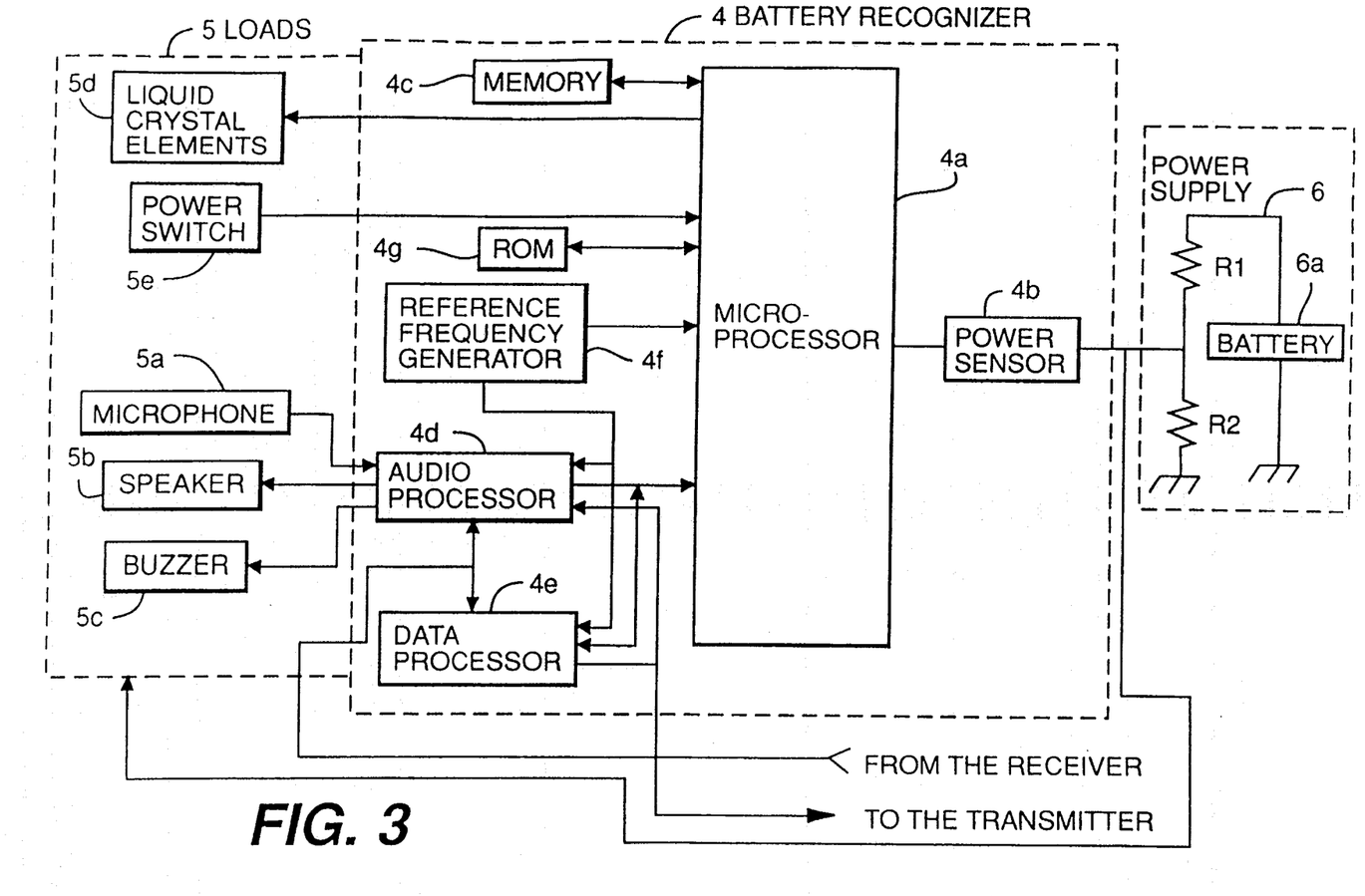
FIG. 3 is a diagram illustrating in detail a battery recognizer, a load and a power supply of FIG. 2.

FIG. 3 is a detailed diagram illustrating battery recognizer 4, loads 5 and power supply 6. Loads 5 include a speaker 5b, a liquid crystal data display element 5a and a buzzer 5c. Loads 5 also input an on/off status signal for power switch 5e and transmit sound signals from the microphone 5a to the battery recognizer 4.

In battery recognizer 4, a battery power sensor 4b detects the power level of a battery 6a mounted in power supply 6 and converts the detected power to a digital signal. A microprocessor 4a repeatedly samples the digital signal from battery power sensor 4b up to a certain number of times and stores a sampled value in a memory 4c. These stored values are arithmetically processed, as described in more detail below. A result of this arithmetic processing is compared with a reference value. According to the result of this comparison, the type of the battery 6a is recognized, and system operation is controlled accordingly.

A data processor 4e processes data from receiver 2 in response to a control signal from the microprocessor 4a.

An audio processor 4d processes the audio signal from the receiver 2 (FIG. 2) and the data signal from the microprocessor 4a and provides these processed signals to buzzer 5b and speaker 5c in loads 5. Audio processor 4d also processes the transmitting sound signal from the microphone 5a and transmits the signal to transmitter 7.

A reference frequency generator 4f generates a reference frequency signal for application to microprocessor 4a. This reference frequency signal is divided also provided to audio processor 4d and data processor 4e. An electrically erasable and programmable ROM 4g stores various data for microprocessor 4a.

An operation of the preferred embodiment of the present invention will now be described in detail with reference to FIGS. 2 to 7.

Figure 4:
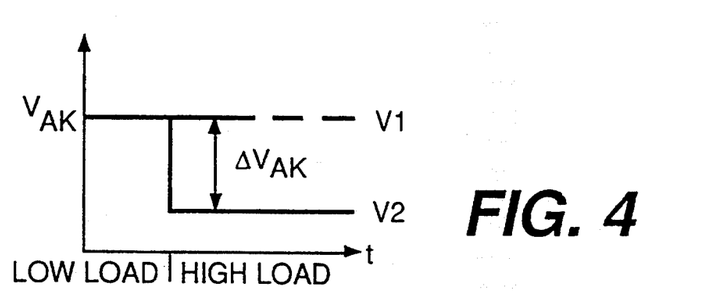
FIG. 4 is a diagram illustrating an output voltage characteristic according to an internal impedance of an alkaline battery.
Figure 5:
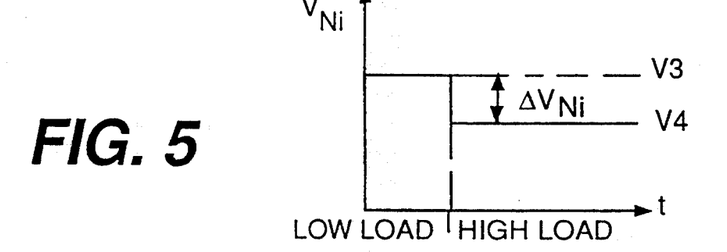
FIG. 5 is a diagram illustrating an output voltage characteristic according to an internal impedance of an Ni—Cd battery.
Figure 7:
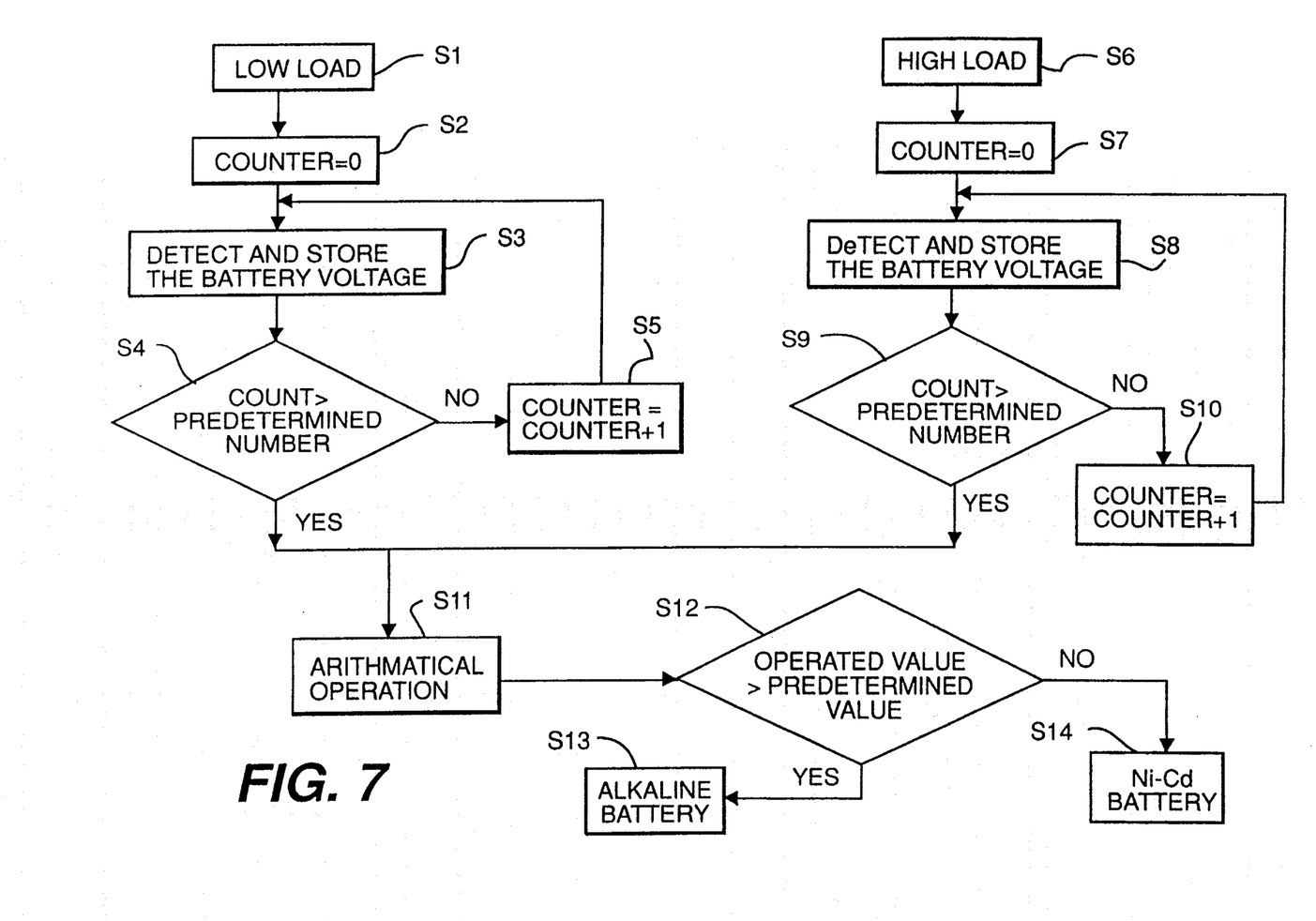
FIG. 7 is a flow-chart illustrating operation of FIG. 2.

FIG. 7 shows the operation of the preferred embodiment of the present invention. When a user turns on power switch 5e in loads 5, microphone 5a, speaker 5b, buzzer 5c and liquid crystal display elements 5d remain in a relatively low loaded state (a "low load state") (step S1 in FIG. 7). FIG. 4 shows an output voltage characteristic of an alkaline battery, and FIG. 5 shows an output voltage characteristic of an Ni—Cd battery. In the low load State, the output voltage of battery 6a is a predetermined voltage V1, as shown in FIGS. 4, of V3 as shown in FIG. 5. The output voltage of the battery 6a is divided through resistors R1 and R2 and applied to the battery power sensor 4b of the battery recognizer 4. The battery power sensor 4b converts the predetermined voltage V1 (or V3) to a digital signal and provides it to the microprocessor 4a. The microprocessor 4a resets an internal counter (not shown) (step S2), reads the voltage detected from the battery power sensor 4b, and stores the detected value in the memory 4c (step S3) until the count reaches a predetermined count number (steps S4 and S5).

When at least one load in load 5 is turned on, load 5 is in a relatively high loaded state (a "high load state") (step S6). The voltage of the battery in the power supply 6 drops from V1(V3) to V2(V4) due to the differences in internal impedances, as shown in FIGS. 4 and 5. In the high load state, the battery power sensor 4b converts the dropped voltage V2 (or V4) to the digital signal and provides it to the microprocessor 4a. Then, the microprocessor 4a resets the internal counter (step S7), reads the dropped voltage V2 (or V4) from the battery power sensor 4b, and stores it in the memory 4c (step S8). In other words, the microprocessor 4a continues to read the voltage from the battery power sensor 4b and sequentially stores it in the memory 4c until the count reaches a predetermined number (steps S9 and S10).

When the count reaches the predetermined number, the dropped voltage V2 (or V4) and the predetermined voltage V1 (or V3) stored sequentially in the memory 4c are arithmetically processed and the result of the processing is compared with a reference value (step S11). By arithmetically processing the voltage V1 (or V3) detected in the low load state and the voltage V2 (or V4) detected in the high load state, the voltage difference $\Delta VAK$ in case of the alkaline battery, or $\Delta VNi$ in case of the Ni—Cd battery is obtained.

More specifically, when an alkaline battery is used, the predetermined voltage V1 detected in the low load state and the dropped voltage V2 detected in the high load state are arithmetically processed by subtracting to obtain the voltage difference $\Delta VAK$. Alternatively, when the Ni—CD battery is used, the predetermined voltage V3 detected in the low load state and the dropped voltage V4 detected in the high load state are subtracted to obtain the voltage difference $\Delta VNi$. It has been experimentally determined that the voltage difference $\Delta VAK$ of the alkaline battery is 1 V, and that the voltage difference $\Delta Ni$ of the Ni—Cd battery is 0.1 V.

The voltage difference $\Delta VAK$ (or $\Delta VNi$) of the alkaline battery or the Ni—Cd battery 6a is compared with predetermined reference voltage $\Delta \propto$ (step 12). The reference voltage $\Delta \propto$ is set by averaging a difference value of the predetermined voltage V1 (or V3) and the dropped voltage V2 (or V4). In other words, the reference voltage $\Delta \propto$ is established by the following formula:

$$\Delta \propto = (\Delta VAK + \Delta VNi)/2$$

After comparing the reference voltage $\Delta \propto$ on a voltage difference basis (AVAK or AVNi), the microprocessor 4a recognizes the mounted battery 6a as an alkaline battery if the voltage difference $\Delta VAK$ (or $\Delta VNi$) is greater than the reference voltage $\Delta \propto$, and as Ni—Cd battery if the voltage difference $\Delta VAK$ (or $\Delta VNi$) is smaller than the reference voltage $\Delta \propto$ (steps S13 and S14).

By comparing the voltage difference to a reference voltage, the preferred embodiment of the present invention detects an electrical characteristic corresponding to an internal impedance of the battery to determine a type of battery.

In an alternative embodiment of the present invention, step S11 produces a voltage sum instead of a voltage difference. When the alkaline battery is used, the predetermined voltage V1 detected in the low load state and the dropped voltage V2 detected in the high load state are arithmetically processed by adding to obtain the voltage sum $\Delta VAK'$. When the Ni—Cd battery is used, the predetermined voltage V3 detected in the low load state and the dropped voltage V4 detected in the high load state are added to obtain the voltage sum $\Delta VNi'$.

The voltage sum $\Delta VAK'$ (or $\Delta VNi'$) of the alkaline battery or the Ni—Cd battery 6a is compared with the predetermined reference voltage $\Delta \propto$ (step 12). In this alternative embodiment, the reference voltage $\Delta \propto$ is set by averaging the sum value of the predetermined voltage V1 (or V3) and the dropped voltage V2 (or V4):

$$\Delta \propto = (\Delta VAK' + \Delta VNi')/2$$

Comparing the reference voltage $\Delta \propto$ on a voltage sum basis ($\Delta VAK'$ or $\Delta VNi'$), microprocessor 4a recognizes battery 6a as an alkaline battery if the voltage sum $\Delta VAK'$ (or $\Delta VNi'$) is smaller than the reference voltage $\Delta \propto$, and as the Ni—Cd battery if the voltage sum $\Delta VAK'$ (or $\Delta VNi'$) is greater than the reference voltage $\Delta \propto$ (steps S13 and S14).

In other words, microprocessor 4a sequentially reads the predetermined value V1 (V3) and the dropped voltage V2 (or V4) from the memory 4c, and arithmetically processes them. The result of this processing is compared with the predetermined reference value as described above. Microprocessor 4a determines whether a majority of the comparison results indicate a Ni—Cd battery or, instead, indicate an alkaline battery. If the number of comparisons indicating an alkaline battery is greater than the number of comparisons indicating Ni—Cd battery, the battery mounted in the power supply 6 is considered an alkaline battery. If the number of comparisons indicating a Ni—Cd battery is greater than the number of comparisons indicating an alkaline battery, the battery mounted in the power supply is considered an Ni—Cd battery.

After the battery type is determined, when the high-frequency signal is received from the antenna ANT, the high-frequency signal is provided to receiver 2 via filter 1. Receiver 2 amplifies the high-frequency signal and mixes the amplified signal with the local oscillation frequency generated from phase synchronizing loop 3. From this mixed frequency, the middle-frequency is detected and restored to an original signal. This original signal is provided to audio processor 4d and data amplifies the sound signal from receiver 2 to a certain level and applies it to speaker 5b in loads 5. Data processor 4e detects the data from receiver 2 according to the frequency generated from reference frequency generator 4f and provides the detected data to microprocessor 4a. When the audio signal is detected through microphone 5a in loads 5, audio processor 4d processes the audio signal and transmits the processed signal to transmitter 7. Data processor 4e processes various data from microprocessor 4a and provides the processed data to transmitter 7. Transmitter 7 modulates the inputted audio signal and transmitting data to the high-frequency of phase synchronizing loop 3. This modulated frequency signal is amplified and transmitted to the antenna via transmitting filter.

Figure 6:
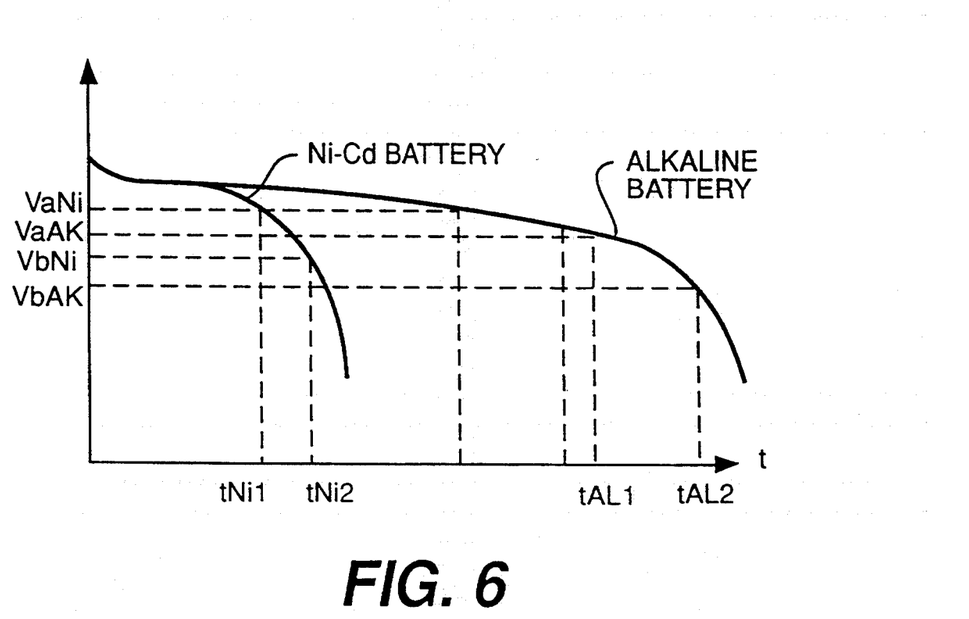
FIG. 6 is a graph illustrating monitored voltages for the alkaline battery and the Ni—Cd battery according to a preferred embodiment of the present invention.

FIG. 6 shows that the monitored voltages in the preferred embodiment of the present invention indicate that the power of battery 6a mounted in power supply 6 is gradually consumed and that the voltage of battery 6a is gradually reduced to the end point of the available voltage. As shown in FIG. 6, the available and cut-off voltage of t2he alkaline battery is set to be different from those of the Ni—Cd battery.

In FIG. 6, the available voltage of alkaline battery is referred to as VaAK and that of Ni—Cd battery as VaNi; the cut-off voltage of alkaline battery as VbAK and that of Ni—Cd battery as VbNi; and the available time of alkaline battery as tAL2 and that of Ni—Cd battery as tNi2. The microprocessor 4a continuously detects the battery voltage and generates an alarm signal indicating battery charge when the battery voltage falls below VaAK (in case of Ni—Cd battery), and generates an annunciating signal indicating battery replacement (in case of alkaline battery).

As shown in FIG. 6, when mounted battery 6a is recognized as an alkaline battery, microprocessor 4a sets the monitored voltages to have lower values than monitored voltages for a Ni—Cd battery, thereby allowing the usable power of alkaline battery to be sufficiently used up.

As described above, according to the preferred embodiment of the present invention, recognition of a battery type is performed by detecting the dropped voltage variation due to the internal impedance difference of a battery. When the mounted battery is recognized as an alkaline battery, battery monitored voltages are set to have lower value than monitored voltages of a rechargeable Ni—Cd battery. Thus, the usable voltage of alkaline battery having long and linear discharge characteristics is sufficiently used up, thereby avoiding the inconvenience of an unnecessary battery replacement.

Although the present invention has been described with reference to specific embodiments, it should be understood that these embodiments are exemplary preferred embodiments and that modifications may be made without departing from the scope of the invention as defined in the appended claims.

What is claimed is:

1. In an apparatus for receiving a battery including a first terminal for delivering current to a load and a second terminal for receiving current from the load, a method of determining use of the battery, the method comprising the steps, performed by the apparatus, of:
   detecting an electrical characteristic of a circuit including the first and second terminals; and
   determining the type of battery in accordance with the electrical characteristic.

2. The method of claim 1, wherein the detecting step includes the substep of detecting an electrical characteristic corresponding to an internal impedance of the battery.

3. The method of claim 1, wherein the determining step includes the substep of determining a monitored voltage for the battery.

4. A method for recognizing a type of battery, the method comprising the steps of:
   detecting a first voltage across a first load;
   detecting a second voltage across a second load higher than the first load;

calculating a first value in accordance with the first and second voltages;

comparing the first value with a second value to produce a comparison result; and determining the type of battery in accordance with the comparison result.

5. The method of claim 4, further included a step of determining the second value from voltage values of the first and second voltages for a first battery type and voltage values of the first and second voltages for a second battery type.

6. The method of claim 5, wherein the battery includes an electrochemical cell, and wherein the step of detecting the first voltage includes the substep of detecting the first voltage across the first load electrically coupled to the electrochemical cell, and wherein the step of detecting the second voltage includes the substep of detecting the second voltage across the second load electrically coupled to the electrochemical cell.

7. The method of claim 4, wherein the calculating step includes the substep of calculating the first value by adding the first and second voltages, and the determining step includes the substeps of determining that the battery is an alkaline battery when the first value is greater than the second value and determining that the battery is an Ni—Cd battery when the first value is smaller than the second value.

8. The method of claim 7, wherein the battery includes an electrochemical cell, and wherein the step of detecting the first voltage includes the substep of detecting the first voltage across the first load electrically coupled to the electrochemical cell, and wherein the step of detecting the second voltage includes the substep of detecting the second voltage across a second load electrically coupled to the electrochemical cell.

9. The method of claim 4, wherein the calculating step includes the substep of calculating the first value by calculating a difference between the first and second voltages, and the determining step includes the substeps of determining the battery to be a Ni—Cd battery when the first value is greater than the second value and determining the battery to be an alkaline battery when the first value is smaller than the second value.

10. The method of claim 7, further comprising the step of adjusting a monitored voltage for the alkaline battery to have lower value than a monitored voltage for a Ni—Cd battery.

11. The method of claim 10, wherein the battery includes an electrochemical cell, and wherein the step of detecting the first voltage includes the substep of detecting the first voltage across the first load electrically coupled to the electrochemical cell, and wherein the step of detecting the second voltage includes the substep of detecting the second voltage across the second load electrically coupled to the electrochemical cell.

12. The method of claim 7, further comprising the step of adjusting a monitored voltage for the alkaline battery to have lower value than a monitored voltage for a Ni—Cd battery.

13. The method of claim 12, wherein the battery includes an electrochemical cell, and wherein the step of detecting the first voltage includes the substep of detecting the first voltage across the first load electrically coupled to the electrochemical cell, and wherein the step of detecting the second voltage includes the substep of detecting the second voltage across the second load electrically coupled to the electrochemical cell.

14. The method of claim 9, wherein the battery includes an electrochemical cell, and wherein the step of detecting the first voltage includes the substep of detecting the first voltage across the first load electrically coupled to the electrochemical cell, and wherein the step of detecting the second voltage includes the substep of detecting the second voltage across the second load electrically coupled to the electrochemical cell.

15. The method of claim 4, wherein the detecting steps includes the substep of sampling the second voltage, a plurality of times.

16. The method of claim 15, wherein the comparing step is performed a plurality of times before conducting the determining step.

17. The method of claim 16, wherein the battery includes an electrochemical cell, and wherein the step of detecting the first voltage includes the substep of detecting the first voltage across the first load electrically coupled to the electrochemical cell, and wherein the step of detecting the second voltage includes the substep of detecting the second voltage across the second load electrically coupled to the electrochemical cell.

18. The method of claim 10, wherein the comparing step is performed a plurality of times for each performance of the determining step, and wherein the determining step includes the substep of determining the type of battery in accordance with a majority of the results of the performances of the comparing step.

19. The method of claim 18, wherein the battery includes an electrochemical cell, and wherein the step of detecting the first voltage includes the substep of detecting the first voltage across a first load electrically coupled to the electrochemical cell, and wherein the step of detecting the second voltage includes the substep of detecting the second voltage across the second load electrically coupled to the electrochemical cell.

20. The method of claim 15, wherein the battery includes an electrochemical cell, and wherein the step of detecting the fist voltage includes the substep of detecting the first voltage across the first load electrically coupled to the electrochemical cell, and wherein the step of detecting the second voltage includes the substep of detecting the second voltage across the second load electrically coupled to the electrochemical cell.

21. The method of claim 4, further comprising the step of adjusting a monitored voltage of the battery in accordance with a result of the determining step.

22. The method of claim 21, wherein the battery includes an electrochemical cell, and wherein the step of detecting the first voltage includes the substep of detecting the first voltage across a first load electrically coupled to the electrochemical cell, and wherein the step of detecting the second voltage includes the substep of detecting the second voltage across the second load electrically coupled to the electrochemical cell.

23. The method of claim 4, wherein the battery includes an electrochemical cell, and wherein the step of detecting a first voltage includes the substep of detecting the first voltage across the first load electrically coupled to the electrochemical cell, and wherein the step of detecting a second voltage includes the substep of detecting the second voltage across the second load electrically coupled to the electrochemical cell.

24. A device for recognizing different types of batteries comprising:

means for receiving a battery;

means for detecting voltages of the batteries under a first load and under a second load higher than the first load;

means for storing the detected voltages;

means for processing the stored voltages to produce a processed value;

means for comparing the processed value with a predetermined value to produce a comparison result; and means for controlling a monitored voltage of the batteries in accordance with the comparison result.

25. A device for recognizing different types of batteries according to claim 14, wherein the predetermined value is a result of averaging processed values of different types of batteries.

26. The device for recognizing different types of batteries according to claim 15, wherein the battery comprises an electrochemical cell, and wherein the detecting means includes means for detecting the first voltage across the first load electrically coupled to the electrochemical cell and for detecting the second voltage across the second load electrically coupled to the electrochemical cell.

27. The device for recognizing different types of batteries according to claim 24, wherein the battery comprises an electrochemical cell, and wherein the detecting means includes:

means for detecting the first voltage across the first load electrically coupled to the electrochemical cell and for detecting the second voltage across the second load electrically coupled to the electrochemical cell.

* * * * *

UNITED STATES PATENT AND TRADEMARK OFFICE
CERTIFICATE OF CORRECTION

PATENT NO. : 5,438,248
DATED : August 1, 1995
INVENTOR(S) : Jae Hyuck LEE et al

It is certified that error appears in the above-indentified patent and that said Letters Patent is hereby corrected as shown below:

Title page, item [75] "Hyuck" should read --Lee-- and "Lee J. Hyuck" should read --Jae Hyuck Lee--.

Item [57] Abstract, LINE 8 "cadmimum" should read --cadmium--.

Column 7,

CLAIMS 10 and 12 are identical and it appears that one of these claims should be cancelled as being redundent.

CLAIM 15, COLUMN 8, LINE 15 "includes" should read --include--.

CLAIM 25, COLUMN 9, line 22, "claim 14" should read --claim 24--.

UNITED STATES PATENT AND TRADEMARK OFFICE
CERTIFICATE OF CORRECTION

PATENT NO. : 5,438,248
DATED : August 1, 1995
INVENTOR(S) : Jae Hyuck Lee et al

It is certified that error appears in the above-indentified patent and that said Letters Patent is hereby corrected as shown below:

CLAIM 26, COLUMN 10, LINE 4, "claim 15" should read --claim 25--.

Signed and Sealed this

Thirty-first Day of December, 1996

Attest:

BRUCE LEHMAN

*Attesting Officer*     *Commissioner of Patents and Trademarks*